United States Patent [19]

Mattison

[11] Patent Number: 4,589,221

[45] Date of Patent: May 20, 1986

[54] FISHING LURE AND ENTRAPMENT DEVICE

[76] Inventor: Robert N. Mattison, 5826 McKinley Pl. North, Seattle, Wash. 98103

[21] Appl. No.: 607,284

[22] Filed: May 4, 1984

[51] Int. Cl.$^4$ .............................................. A01K 85/01
[52] U.S. Cl. .................... 43/17.6; 43/42.24; 43/17.5
[58] Field of Search ............... 43/17.5, 17.6, 42.24; 362/34

[56] References Cited

U.S. PATENT DOCUMENTS

| | | | |
|---|---|---|---|
| 62,042 | 2/1867 | Lee | 43/43.16 |
| 272,317 | 2/1883 | Pflueger | 43/17.6 |
| 756,438 | 4/1904 | Uhlenhart | 43/17.5 |
| 2,100,103 | 6/1932 | Knowles | 43/43.16 |
| 2,117,206 | 5/1938 | Neff | 43/17.6 |
| 3,568,354 | 3/1971 | Yacko | 43/17.6 |
| 3,576,987 | 5/1971 | Voight et al. | 240/2.25 |
| 3,579,895 | 5/1971 | Orn et al. | 43/42.06 |
| 3,597,362 | 8/1971 | Bollyky et al. | 252/186 |
| 3,680,250 | 8/1972 | Hetrick | 43/54.5 R |
| 3,762,092 | 10/1973 | Bercz | 43/17.6 |
| 3,861,072 | 1/1975 | Holcombe | 43/17.6 |
| 3,863,380 | 2/1975 | Purlia | 43/17.6 |
| 3,895,455 | 7/1975 | Johnston | 43/17.6 |
| 3,921,328 | 11/1975 | Holcombe | 43/17.6 |
| 3,940,868 | 3/1976 | Northcutt | 43/17.6 |
| 4,501,084 | 2/1985 | Mori | 43/17.5 |

FOREIGN PATENT DOCUMENTS

| | | | |
|---|---|---|---|
| DT2757998-A1 | 6/1979 | Fed. Rep. of Germany | 43/17.6 |
| 2232268 | 1/1975 | France | 43/17.6 |
| 59225 | 4/1938 | Norway | 43/17.6 |

OTHER PUBLICATIONS

"New from Sevenstrand," *Preview '85*, Circle No. 325 on Reader Service Card, AFTMA Booth 0706, Fishing Tackle Retailer Magazine, Jul. 1984, p. 206.

*Primary Examiner*—Nicholas P. Godici
*Assistant Examiner*—C. McKee
*Attorney, Agent, or Firm*—Seed and Berry

[57] ABSTRACT

A fishing lure having a sealed tubular container of chemicals for generating chemiluminescent light upon mixture, and a body having an elongated, cylindrical portion with a cavity for removably retaining the tubular container therein. The cavity has an end wall opening for insertion of the tubular container and the cavity is sized to slidably receive and frictionally engage the tubular container. The body is flexible and translucent, and has a flexible tail portion attached thereto. In a second embodiment, the body has flexible side walls with a longitudinal opening therethrough for insertion of the tubular container into the cavity. In both embodiments, the cavity is oriented substantially coaxial with the elongated body. In another embodiment of the fishing lure, the body has a rigid spoon shape, and retainer clips are fixedly attached to the body and releasably engage the chemiluminescent light tubular container. The clips hold the container in rigid, substantial longitudinal alignment with the body, and with the container below and adjacent to the body. Also disclosed is an underwater trap. The trap has a walled enclosure having openings therein for entry of catch into the interior portions thereof, and the enclosure walls have openings for transmission of light therethrough. The trap also has an attachment member within the interior of the trap for suspending the chemiluminescent light container within the interior portion of the walled enclosure.

6 Claims, 5 Drawing Figures

U.S. Patent May 20, 1986 4,589,221
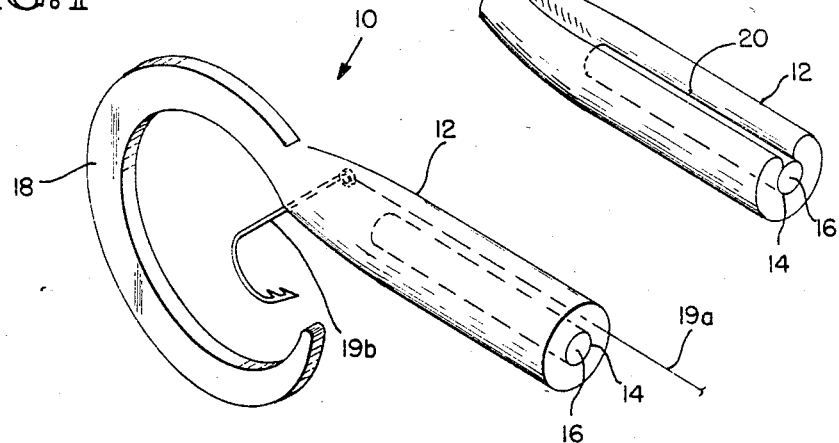
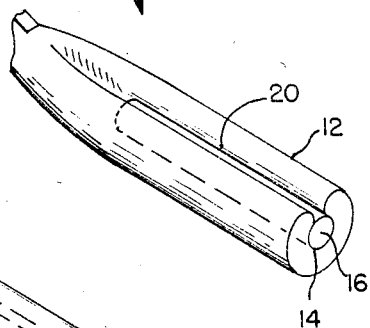
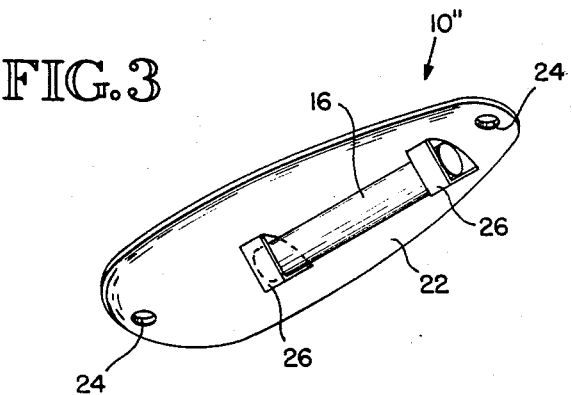
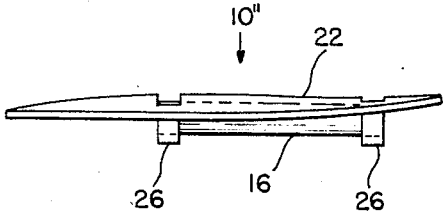
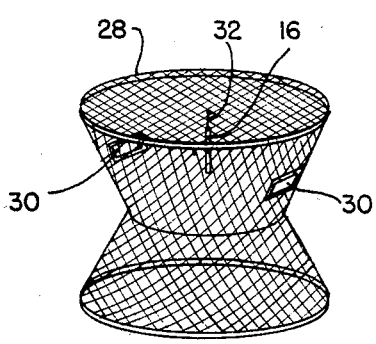

FISHING LURE AND ENTRAPMENT DEVICE

DESCRIPTION

1. Technical Field

The present invention relates generally to fishing equipment, and more particularly, to fishing lures and fish and shellfish entrapment devices.

2. Background Art

In the past, many attempts have been made to improve the attractiveness of fishing lures and other fish and shellfish entrapment devices. One such attempt has been the use of electrically powered lights. Since water in its natural state is a conductor and highly corrosive, especially saltwater, many problems are associated with the use of electric lights. The water causes short circuits and causes metal contacts and other parts to corrode. Where the electricity is supplied by power lines from a generator or other source, the extension and maintenance of the lines is difficult and, for sports fishing, impractical. Use of a power line when fishing with a reel at any appreciable depth is not feasible.

While a light bulb and battery arrangement in a sealed compartment might be used, this approach has associated problems. Insufficient illumination, heavy weight, bulky size, leakage of water into the compartment, replacement of batteries, and switching of power to the light bulb are a few of the problems. As an alternative to electrically powered lights, fluorescent paint has been used on fishing lures; however, the amount of illumination provided is minimal. This is particularly so if the fishing is done at a depth with insufficient light or the fishing is done on an overcast day.

It will be appreciated that there has been a need for a convenient and inexpensive illuminated fishing lure and entrapment device for fish and shellfish not requiring the use of wires, batteries, or light bulbs, and providing a self-contained source of light. The present invention fulfills this need and further provides other related advantages.

DISCLOSURE OF THE INVENTION

The present invention resides in a fishing lure and entrapment device for fish and shellfish. The fishing lure includes a water immersible body attachable to a fishing line, and means for attaching to the body a waterproof, sealed container of chemicals for generating chemiluminescent light. The container holds chemicals which generate chemiluminescent light upon mixture.

In one embodiment of the fishing lure, the body is translucent and the attachment means is a cavity in the body sized to slidably receive and frictionally engage the container. The cavity has an end wall opening for removable insertion of a chemiluminescent light container into the cavity. In another embodiment, the body is flexible the attachment means is a cavity in the body with an elongated side wall opening for insertion of the container therethrough into the cavity. In both embodiments, the body is elongated and the cavity is cylindrical and oriented substantially coaxial with the body. The chemiluminescent light container is tubular in shape.

In another embodiment of the fishing lure, the body has clip means for removably attaching the container to the body. The body has a rigid spoon shape, and the clip means includes retainer clips fixedly attached to the body and sized to receive and releasably engage the container. The container is tubular and the clips project from the body and are spaced apart sufficiently to each retain one end portion of the tubular container. The clips hold the tubular container in substantial longitudinal alignment with the body. The body has means for attachment of a fishing line to a first end portion of the body and a hook to a second end portion of the body remote from the first end portion. The clips attach the chemiluminescent light container below and adjacent to the body, and attach the container rigidly to the body.

Another embodiment of the invention is an underwater trap. The trap is a walled enclosure having an opening therein for entry of catch into an interior portion thereof. The enclosure walls have openings for transmission of light therethrough. The trap also includes means for retaining a sealed container of chemicals for generating chemiluminescent light upon mixture suspended within the interior portion of the trap.

Other features and advantages of the invention will become apparent from the following detailed description, taken in conjunction with the accompanying drawings.

BRIEF DESCRIPTION OF THE DRAWINGS

FIG. 1 is an isometric view of a fishing lure embodying the present invention.

FIG. 2 is a fragmentary, isometric view of an alternative embodiment of the fishing lure shown in FIG. 1.

FIG. 3 is another alternative embodiment of a fishing lure embodying the present invention.

FIG. 4 is a side elevational view of the fishing lure of FIG. 3.

FIG. 5 is an isometric view of a trap embodying the present invention.

BEST MODE FOR CARRYING OUT THE INVENTION

As shown in the drawings for purposes of illustration, one embodiment of the present invention is a fishing lure, indicated generally by reference numeral 10. In the embodiment of the fishing lure shown in FIG. 1, the fishing lure 10 has a cylindrical body portion 12 manufactured of a transluscent material and having an open-ended cylindrical cavity 14 therein. The cavity 14 is sized to receive and frictionally engage a cylindrical container 16 holding chemicals for generating chemiluminescent light upon mixture of the chemicals. The fishing lure 10 further has a rearwardly projecting arcuate tail portion 18 with a flat profile. The tail portion 18 is attached to the body portion 12 at an end remote from the open end of the cavity 14.

In the presently preferred embodiment of the invention shown in FIG. 1, the fishing lure 10 is manufactured of a soft, flexible rubber that is sufficiently translucent to transmit enough of the light generated by the chemiluminescent light container 16 to attract fish. The fishing lure 10 may be connected to a fishing line 19a by piercing the body portion 12 with a hook 19b attached to the line and threading the hook and line longitudinally through the body portion and projecting the shank of the hook out from the fishing lure in the vicinity of the tail portion 18. While the fishing lure 10 may be manufactured in different sizes, in one embodiment the body portion 12 has a 0.5 inch diameter and holds a chemiluminescent light container 16 having a length of from 0.19 to 1.5 inches. The tail portion 18 has a thickness of 0.063 inches.

An example of the chemiluminescent light container 16 usable with the present invention is shown in U.S. Pat. No. 3,576,987 and its chemical composition is disclosed in U.S. Pat. No. 3,597,362, said descriptions being incorporated herein by reference. The chemiluminescent light container 16 requires no wires, battery or light bulb, such as do electric lights, but yet provides sufficient illumination to attract fish and improve the performance of the fishing lure 10. The chemiluminescent light container 16 has a sealed plastic exterior to prevent leakage of water into or chemicals out of the container, and is a self-contained source of light. The generation of chemiluminescent light is started upon bending of the container sufficiently to break an inner rigid tube (not shown) within the container 16 which contains one of the chemiluminescent chemical components which when mixed create light. The other chemical component is found within the container 16, exterior of the rigid tube. It is noted that the invention is not limited by the use of a rigid tube to cause intermixing of the chemical components, but includes any other means by which the chemical components may be conveniently mixed within the sealed container 16 to start the generation of the chemiluminescent light.

Another embodiment of the fishing lure 10' is shown in FIG. 2. The compartment 14 of the body portion 12 has an elongated opening 20 in its side wall through which the chemiluminescent light container 16 may be conveniently inserted. The flexibility of the side walls of the body 12 resiliently retain the chemiluminescent light container 16 within the body in a clamping fashion.

Another alterative embodiment of the fish lure 10" is shown in FIGS. 3 and 4. The fishing lure 10" has a rigid, spoon-shaped body 22 with an opening 24 through each of its longitudinal end portions for securing a fishing line, leader, or hook thereto.

The body 22 also has two clips 26 projecting downwardly therefrom to slidably engage and retain the chemiluminescent light container 16. The clips 26 are spaced apart sufficiently to each engage one of the end portions of the chemiluminescent light container 16. The clips 26 may be manufactured by stamping the clips out of the body 22 of the fishing lure 10", or by use of resilient pairs of arms (not shown) attached to the body end between which the chemiluminescent light container may be snap-fitted into place. In the presently preferred embodiment of the fishing lure 10' shown in FIGS. 3 and 4, the body 22 is manufactured of nickel-plated brass.

Another embodiment of the invention is shown in FIG. 5 and comprises a trap 28 for fish or shellfish having entrance apertures 30 therein. The chemiluminescent light container 16 is suspended by an attachment member 32 within the interior of the trap 28. In such manner, the light produced by the chemiluminescent light container 16 will attract fish or shellfish into the trap 28.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A fishing lure for housing an elongated chemiluminescent capsule having a resilient cylindrical outer surface and a predetermined length, comprising a translucent soft and flexible body having a body portion and a freely movable tail portion extending rearwardly therefrom, said body portion having an elongated substantially cylindrical cavity therewithin with a rearward closed end, said cavity having a length sized to receive and maintain the capsule substantially fully within said cavity, and having a width sized sufficiently small to frictionally engage outer surface of the capsule to firmly hold the capsule within said cavity, said body portion further including a sidewall defining said cavity having an elongated sidewall opening with a width smaller than the width of the capsule for insertion and removable therethrough of the capsule into and from said cavity, said opening having a width smaller than the width of the capsule, said sidewall having sidewall portions adjacent to and defining said opening with sufficient flexibility to be manually moved apart to permit passage of the capsule through said opening and with sufficient resiliency to return to their original position and assist in retaining the capsule in said cavity during normal usage of the fishing lure, said sidewall having at least a lengthwise portion with a sidewall thickness sufficient to be pierced by a hook for longitudinally threading a line attached to the hook therethrough for firm attachment of said body portion to the line.

2. The fishing lure of claim 1 wherein said cavity is cylindrical and oriented substantially coaxial with said body portion.

3. A fishing lure for housing an elongated chemiluminescent capsule having a resilient cylindrical outer surface and a predetermined length, comprising a translucent soft and flexible body having an elongated body portion and an arcuate freely movable tail portion extending rearwardly therefrom, said body portion having an elongated cylindrical cavity therewithin oriented substantially coaxial with said elongated body portion with rearward closed end, said cavity having a length sized to receive and maintain the capsule substantially fully within said cavity, and having a diameter sized sufficiently small to frictionally engage the outer surface of the capsule to firmly hold capsule within said cavity, said body portion further including a sidewall defining said cavity having an elongated sidewall opening with a width smaller than the width of the capsule for insertion and removal therethrough of the capsule into and from said cavity, said opening having a width smaller than the width of the capsule, said sidewall having sidewall portions adjacent to and defining said opening with sufficient flexibility to be manually moved apart to permit passage of the capsule through said opening and with sufficient resiliency to return to their original positions and assist in retaining the capsule in said cavity during normal usage of the fishing lure, said sidewall having at least a lengthwise portion with a sidewall thickness sufficient to be pierced by a hook for longitudinally threading a line attached to the hook therethrough for firm attachment of said body portion to the line.

4. A fishing lure using an elongated chemiluminescent capsule having a resilient outer surface and a predetermined length, comprising:
   a rigid, elongated spoon-shaped body having a reflective surface on one face side of the body, the body including an aperture adjacent each end of the body for attachment of a fishing line, hook, or the like to the body; and
   a pair of spaced-apart retainers fixedly attached to the body for removably securing the chemiluminescent capsule in substantial longitudinal alignment with the body intermediate the apertures on the side of the body with the reflective surface, the retainers having an opening sized to receive and hold the end portions of the capsule therein with the mid portion of the capsule extending between its end portions held in engagement against the face of the body, the retainers further having associated apertures extending transversely through the body to transmit light from the end portions of the capsule therethrough to the side of the body opposite the reflective surface, the frictional force between the capsule and the retainers and face of the body being sufficient to prevent endwise movement of the capsule during normal usage of the fishing lure, the retainers positioning the capsule to enable the light from the capsule to project back onto the reflective surface of the body and reflect outwardly therefrom.

5. A fishing lure using an elongated chemiluminescent capsule having a resilient outer surface and a predetermined length, comprising:

an elongated plate having a reflective surface on one face side of the plate, the plate including an aperture adjacent each end of the plate for attachment of a fishing line, hook, or the like to the plate, the plate having non-movable means formed integral with the plate for removably securing the chemiluminescent capsule in a lengthwise extending position intermediate the apertures on the sides of the plate with the reflective surface, the capsule being secured so as to enable light from the capsule to project back onto the reflective surface of the plate and reflect outwardly therefrom, the means securing the capsule being a pair of spaced apart retainers having openings sized to receive and hold the end portions of the capsule therein with the mid portion of the capsule extending between its end portions held in engagement against the face of the plate, the frictional force between the capsule and the retainers and face of the plate being sufficient to prevent endwise movement of the capsule during normal usage of the fishing lure, the retainers being formed by permanently deformed spaced apart body portions of the plate projecting outward on the side of the plate with the reflective surface, the retainers further having associated apertures extending transversely through the plate to transmit light from the end portions of the capsule therethrough to the side of the plate opposite the reflective surface.

6. The fishing lure of claim 5 wherein the retainers hold the capsule on a concave side of the plate.

* * * * *